June 15, 1965   H. P. SCHNEIDER   3,189,728
COFFEE MAKING AND WARMING DEVICE
Filed Oct. 28, 1963   2 Sheets-Sheet 1

INVENTOR.
HERBERT P. SCHNEIDER
BY
Hobbs & Easton
ATTORNEYS

June 15, 1965 H. P. SCHNEIDER 3,189,728
COFFEE MAKING AND WARMING DEVICE
Filed Oct. 28, 1963 2 Sheets-Sheet 2
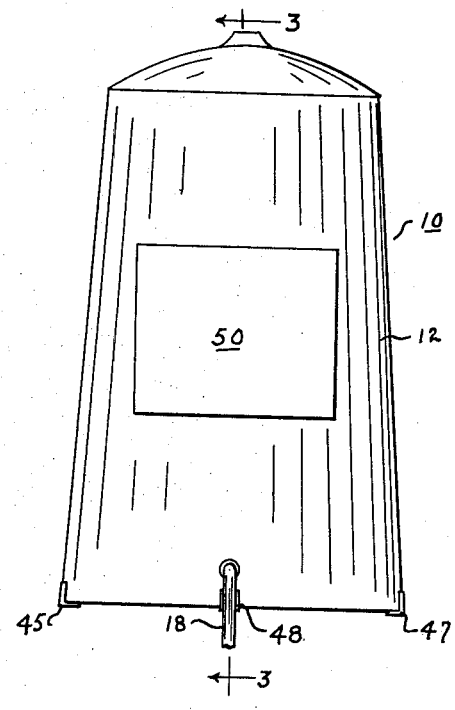
FIG. 2
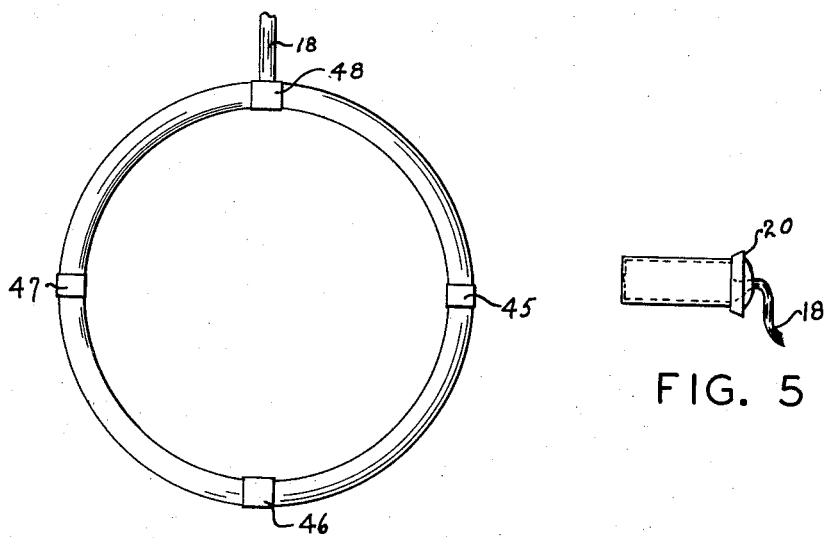
FIG. 4
FIG. 5
INVENTOR.
HERBERT P. SCHNEIDER
BY
*Hobbs & Easton*
ATTORNEYS

United States Patent Office 3,189,728
Patented June 15, 1965

3,189,728
COFFEE MAKING AND WARMING DEVICE
Herbert P. Schneider, 1111 S. 7th, Goshen, Ind.
Filed Oct. 28, 1963, Ser. No. 319,483
2 Claims. (Cl. 219—438)

The present invention relates to a coffee making and warming device and more particularly to a device of this type which can be used to make and warm small quantities of coffee in an automobile or other vehicle.

Since instant coffee and tea have become popular in the last few years, requiring only the heating of water to the desired temperature, coffee breaks are often taken wherever work is being performed. This, however, is inconvenient in vehicles, particularly for the driver, since the only suitable source for an electric device adapted to perform this operation is the lighter, and the driver has difficulty in handling the device in making and warming the coffee or tea as well as in drinking the brewed beverage, while driving the vehicle. In view of the difficulty which the driver encounters in manipulating the coffee making and warming device, this type of device has not become popular in vehicles. In order for a device of this type to be practical, it must be easily grasped and used by the driver and returned to a secure holding means which will prevent the contents from spilling, both while the coffee and/or tea is being brewed and warmed and while it is being held between sips by the driver. The conventional supports, such as a shelf, hook or bracket, have been found unsuitable since the driver must invariably shift his eyes from the road to the driving compartment in order to properly place the device on such a support. Further, the supports which have been available in the past do not hold the device in the position in which the driver can depend upon consistency of handle position, and in which the device will not be easily overturned or the contents otherwise spilled therefrom. It is therefore one of the principal objects of the present invention to provide a coffee making and warming device which permits the driver of a vehicle to easily find and lift the device to his mouth and to return it to the support without at any time removing his eyes from the road or glancing at the device during the operation.

Another object of the present invention is to provide a coffee making and warming device which is held firmly in place in the driving compartment, and which is so constructed and arranged that starting and stopping of the automobile, bumps and road jarring will not splash or spill the contents from the device.

Still another object is to provide a device of the aforesaid type which readily utilizes the parts of the driving compartment for holding the device in an easily reached place for the driver or other occupant of the car while the device is being used to make or warm coffee or tea, and which utilizes the conventional lighter outlet as the source of current for operating the device.

A further object of the invention is to provide a relatively simple, easily handled device for making and warming coffee and tea, which can be fully handled and operated with only one hand, and which is held in a position easily found by the operator of the vehicle while he is driving at night or under traffic conditions preventing him from removing his eyes from the road.

Another object of the present invention is to provide a relatively simple, easily handled device for making and warming coffee and tea, which can be easily stored, containing water, in the driver compartment of the car when it is not in use, so that coffee or tea can be made by the driver of the car by merely plugging the device into the car cigarette lighter, and which is relatively light in weight and small in size so that it does not interfere with the normal use of the driver compartment or with the controls on the instrument panel.

Additional objects and advantages of the present invention will become apparent from the following description and accompanying drawings, wherein:

FIGURE 2 is a front elevational view of the coffee making and warming device illustrated in FIGURE 1, showing the device removed from the instrument panel;

FIGURE 4 is a bottom plan view of the coffee making and warming device shown in the preceding figures; and FIGURE 5 is a side elevational view of a plug for the automobile cigarette lighter, used in combination with the present coffee making and warming device.

Figure 1:
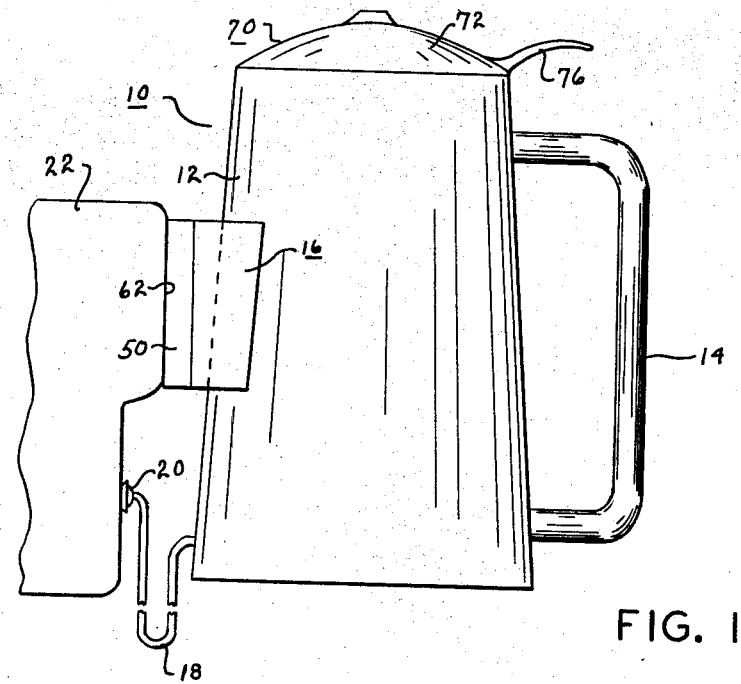
FIGURE 1 is a side elevational view of the present coffee making and warming device showing the device secured to and supported by a portion of the instrument panel or dash board of an automobile, and illustrating the manner in which it is connected into the electrical circuit of the automobile.
Figure 3:
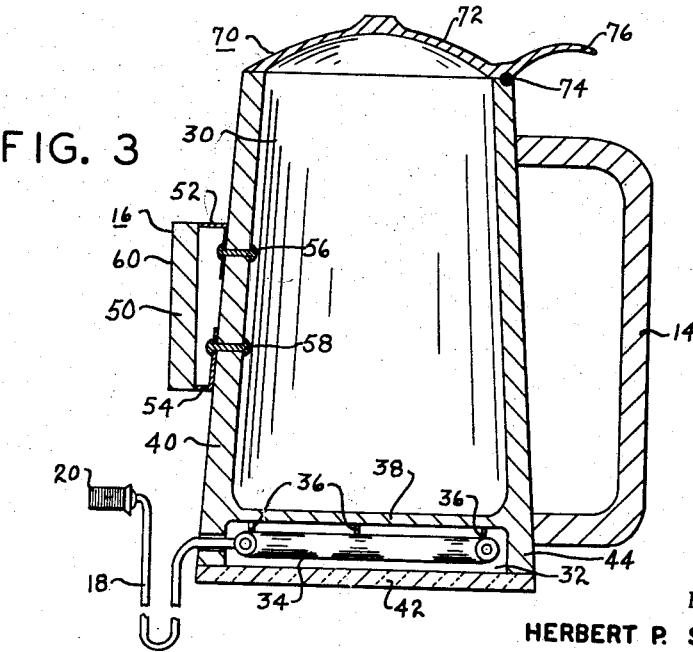
FIGURE 3 is a vertical cross sectional view of the coffee making and warming device shown in FIGURES 1 and 2, the section being taken on line 3—3 of FIGURE 2.

Referring more specifically to the drawings, numeral 10 designates the present coffee making and warming device having a receptacle 12 of aluminum, ceramic, plastic, or any other suitable material, preferably of light weight material. Numeral 14 designates a U-shaped handle joined at its upper and lower ends to the side of receptacle 12, 16 the means for mounting and securing the device to a suitable support in the driver's compartment of the automobile, and numeral 18 an extension cord having a plug 20 for plugging into the automobile cigarette lighter. Numeral 22 indicates a metal portion of the instrument panel of the automobile which, as illustrated in the drawings, forms an element of the supporting structure for the present coffee making and warming device.

The receptacle 12 consists of an upper chamber 30 for water used in the preparation of the coffee or tea and a lower compartment 32 containing a coiled heating element 34 secured therein by a plurality of fixtures 36 attached to the upper side of the heating element and to the underside of partition 38 between chamber 30 and compartment 32, partition 38 being joined integrally to the side walls 40 of the receptacle and forming the bottom for chamber 30. The electrical heating element 34 may be of any suitable and well known construction consisting of an electrical resistance wire, preferably helically wound and sealed to prevent a short in the event it should become loosened from its fixtures 36. The details of the heating element will not be described herein since the elements are conventional and readily available on the market. Compartment 32 is closed by a disc-shaped plate 42 secured to the side walls 44 of compartment 32 by a plurality of clamps 45, 46, 47 and 48 joined to side walls 44 and extending beneath the marginal edge of closure 42; however, any other suitable securing means for retaining closure 42 in place may be used. Heating element 34 is connected by extension cord 18 to plug 20 which can be readily inserted into and removed from the automobile cigarette lighter as electrical energy is required for making and warming coffee and tea in chamber 30.

One of the important features of the present invention is the securing and support means 16 for supporting the receptacle 12, which consists of a permanent magnet 50 secured to the front side of the receptacle by brackets 52 and 54 and rivets 56 and 58 extending through brackets 52 and 54, respectively, and through side wall 40 of the receptacle. Any other suitable means may be used for securing magnet 50 in place on the receptacle as long as the securing means will hold the magnet rigidly to the side wall 40 without causing any leakage through the wall at the place where the bracket or fixtures are secured thereto. Magnet 50 is preferably rather large and adapted to support substantially more weight than the device and its contents, since road jarring, vibration, bumps and fast starting and stopping of the vehicle tend to greatly accentuate the load of these elements on the magnet and, without a substantial margin of safety, would cause the receptacle to become dislodged from the supporting structure. The magnet is preferably provided with a flat face 60 for engaging the flat surface 62 on the instrument panel or other panel strip or plate forming the trim or structural members of the interior of the driving compartment. The magnet being permanent and relatively strong will immediately be attracted to and will adhere to the metallic member 62 and retain the receptacle in place thereon with the handle always projecting rearwardly or any other predetermined position, depending upon the location of the handle on the receptacle. Since the magnet and handle are fixed relatively to one another and since the magnet holds the receptacle in a constant position, i.e. with the magnet facing forwardly and the handle projecting rearwardly, the handle can easily be located by the driver without his removing his eyes from the road.

Another important feature, in combination with the electrical magnet for the present coffee making and warming device, is a cover 70 consisting of a dome-shaped lid 72 pivoted adjacent the handle on a pin 74 and an outwardly projecting lever 76 for raising the lid when the receptacle is to be used. The lid, being substantially heavier than the lever, will fall to closed position and remain in closed position until it is intentionally lifted by lever 76. The lid, which remains closed throughout the operation of the device, except when the device is being filled or the contents are being removed, will prevent the contents from spilling or splashing from chamber 30 as a result of road jarring, vehicle vibration and rapid starting and stopping of the vehicle.

In using the present coffee making and warming device, the water is placed in chamber 30, the desired amount of instant coffee or tea is placed in the water, and the receptacle is secured in place on a metal support, such as a steel plate dash board or instrument panel, as illustrated in FIGURE 1. Plug 20 is then inserted in the automobile cigarette lighter, thus energizing heating element 34 which continues to operate until the water is heated to boiling or the desired temperature for making the proper brew. After the plug is removed from the lighter socket and the contents are ready for use, the operator merely grasps handle 14 and lifts lid 72 by using his thumb to press downwardly on lever 76, thus opening lid 72 and holding it open while he is sipping or drinking from the receptacle. When the receptacle is not being used, or the contents of the receptacle are not being drunk or otherwise poured therefrom, the driver merely releases thumb lever 76, permitting lid 72 to close, thereby preventing splashing or spilling from chamber 30, and the magnet is placed against a metalic supporting surface, such as the instrument panel. Since the receptacle is held rigidly in place by merely placing the magnet against the metallic support, the receptacle can be easily found as the driver wishes to sip from the receptacle from time to time. After the contents have been fully removed, the driver merely places the magnet against the metallic support which holds the receptacle in place until the driver stops the automobile at a service station, for example, where he can clean the receptacle and place fresh water therein for future use.

While only one embodiment of the present invention has been described in detail herein, various changes and modifications may be made without departing from the scope of the invention.

I claim:

1. A device for making and warming coffee and tea in an automobile, comprising a receptacle having walls forming an upper water receiving chamber and a lower compartment, a partition between said chamber and said compartment in fluid-tight relation with the walls, a coiled electrical heating element in said lower compartment, an extension cord connected to said element and extending through the wall of said compartment near the bottom of said receptacle, a plug on the free end of said cord for plugging into the cigarette lighter outlet of an automobile, a bottom plate attached to the lower edge of the walls forming said compartment, a permanent magnet with a board flat outer face positioned along the side wall of said chamber directly above the point at which said cord extends through the wall, a fixture securing said magnet rigidly to the side wall of the chamber with its outer face outwardly directed and in substantially vertical position, a handle of U-shaped configuration positioned on said receptacle wall substantially diametrically opposite to said magnet, and a closure for said chamber pivoted on the receptacle wall directly above said handle and having a lever projecting outwardly to a position above said handle for pivoting said closure, whereby the receptacle can be manipulated by one hand to place the receptacle on and remove it from a vertical support and to open and close the closure.

2. A device for making and warming coffee and tea, comprising a receptacle having walls forming an upper water receiving chamber and a lower compartment, a partition between said chamber and said compartment in fluid-tight relation with the walls, an electrical heating element in said lower compartment, an extension cord connected to said element and extending through the wall of said compartment near the bottom of said receptacle, a plug on the free end of said cord for plugging into the cigarette lighter outlet of an automobile, a permanent magnet with a broad flat outer face positioned along the side walls of said chamber directly above the point at which said cord extends through the wall, a fixture securing said magnet rigidly to the side wall of the chamber with its outer face outwardly directed and in substantially vertical position, a handle secured to said receptacle at a point substantially diametrically opposite to said magnet and having a vertically positioned portion spaced from the side wall of said receptacle, and a closure for said chamber pivoted on the receptacle wall directly above said handle and having a lever projecting outwardly to a position above said handle for pivoting said closure, whereby the receptacle can be manipulated by one hand to place the receptacle on and remove it from a vertical support and to open and close the closure.

References Cited by the Examiner

UNITED STATES PATENTS

| | | | |
|---|---|---|---|
| 2,526,447 | 10/50 | Aiken | 219—436 X |
| 2,541,218 | 2/51 | Doerr | 219—436 |
| 2,826,670 | 3/58 | Keefe | 219—438 X |
| 2,944,691 | 7/60 | Serio | 215—100 |
| 2,957,596 | 10/60 | Rehborg | 248—206 X |

FOREIGN PATENTS

| | | |
|---|---|---|
| 217,833 | 1/57 | Australia. |
| 900,049 | 12/53 | Germany. |

RICHARD M. WOOD, *Primary Examiner.*

ANTHONY BARTIS, *Examiner.*